United States Patent
Sun et al.

(10) Patent No.: US 9,805,575 B2
(45) Date of Patent: Oct. 31, 2017

(54) SMART LED LIGHTING SYSTEM AND MONITORING METHOD THEREOF

(71) Applicant: ZHEJIANG SHENGHUI LIGHTING CO., LTD, Jiaxing (CN)

(72) Inventors: Chaoqun Sun, Jiaxing (CN); Jinxiang Shen, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 0 days.

(21) Appl. No.: 14/785,280

(22) PCT Filed: Feb. 12, 2015

(86) PCT No.: PCT/CN2015/072860
§ 371 (c)(1),
(2) Date: Oct. 16, 2015

(87) PCT Pub. No.: WO2015/131752
PCT Pub. Date: Sep. 11, 2015

(65) Prior Publication Data
US 2016/0071389 A1    Mar. 10, 2016

(30) Foreign Application Priority Data
Mar. 4, 2014  (CN) .......................... 2014 1 0076926

(51) Int. Cl.
*G08B 1/08*        (2006.01)
*G08B 21/02*       (2006.01)
(Continued)

(52) U.S. Cl.
CPC ..... *G08B 21/0222* (2013.01); *G08B 21/0208* (2013.01); *G10L 15/22* (2013.01);
(Continued)

(58) Field of Classification Search
CPC combination set(s) only.
See application file for complete search history.

(56) References Cited

U.S. PATENT DOCUMENTS

2013/0049633 A1    2/2013  Wann et al.
2014/0203939 A1*   7/2014  Harrington ............ H04M 11/04
                                                340/584
(Continued)

FOREIGN PATENT DOCUMENTS

CN    103152925 A    6/2013
CN    103220858 A    7/2013
(Continued)

OTHER PUBLICATIONS

The World Intellectual Property Organization (WIPO) International Search Report for PCT/CN2015/072860 dated Apr. 29, 2015.

*Primary Examiner* — Travis Hunnings
(74) *Attorney, Agent, or Firm* — Anova Law Group, PLLC

(57) ABSTRACT

Smart LED lighting systems and monitoring methods thereof are provided. An exemplary system includes a smart LED lighting device, and a smart terminal configured to communicate with the smart LED lighting device. The smart LED lighting device includes a microphone module, a voice recognition module, and a wireless communication module sequentially connected in series. The microphone module collects audio signals from surroundings and transmits the audio signals to the voice recognition module, such that the voice recognition module sends the audio signals to the smart terminal via the wireless communication module directly, or voice-recognizes the audio signal using an internal audio recognition software program to generate a notification message to send to the smart terminal via the wireless communication module. In this manner, voices can (Continued)

be collected, recognized, and transmitted to a smart terminal to enable simultaneous indoor lighting and smart monitoring.

12 Claims, 2 Drawing Sheets

(51) Int. Cl.
    *H05B 37/02*     (2006.01)
    *G10L 15/22*     (2006.01)
    *G10L 21/0208*     (2013.01)
    *H04R 3/00*     (2006.01)

(52) U.S. Cl.
    CPC .......... *G10L 21/0208* (2013.01); *H04R 3/005* (2013.01); *H05B 37/0236* (2013.01); *H05B 37/0272* (2013.01); *G10L 2021/02082* (2013.01); *Y02B 20/48* (2013.01)

(56) References Cited

U.S. PATENT DOCUMENTS

| | | | |
|---|---|---|---|
| 2014/0354162 A1* | 12/2014 | Sun | H05B 37/0272 315/161 |
| 2016/0205362 A1* | 7/2016 | Tang | H05B 33/0845 348/744 |
| 2016/0212376 A1* | 7/2016 | Tang | F21V 33/0052 |
| 2016/0227633 A1* | 8/2016 | Sun | H05B 37/0236 |
| 2016/0249437 A1* | 8/2016 | Sun | H05B 37/0227 |
| 2016/0284176 A1* | 9/2016 | Harrington | G08B 7/06 |

FOREIGN PATENT DOCUMENTS

| | | |
|---|---|---|
| CN | 103874292 A | 6/2014 |
| CN | 203801112 U | 8/2014 |

\* cited by examiner

SMART LED LIGHTING SYSTEM AND MONITORING METHOD THEREOF

CROSS-REFERENCES TO RELATED APPLICATIONS

This application is a national stage patent application of PCT application No. PCT/CN2015/072860, filed on Feb. 12, 2015. This application claims the priority of Chinese Patent Application No. 201410076926.9, filed on Mar. 4, 2014, the entire content of which is incorporated herein by reference.

FIELD OF THE DISCLOSURE

The present disclosure relates to the field of light emitting diode (LED) technologies and, more particularly, relates to smart LED lighting systems and monitoring methods of the smart LED lighting systems.

BACKGROUND

Wireless technology has been applied to various electronic products and has freed people from cumbersome cablings and assemblies. Products with wireless technologies are now commonly used. LED devices have also been widely used in various areas for public or office indoor lighting. LED lighting may provide advantages including energy conservation, environmental protection, controllable lighting, solid state lighting, and long operational lifetime.

Every family needs lighting devices. Among currently available smart LED products and patents, microphone modules may be configured to use voices for an easy ON/OFF control and for an easy dimming control. However, currently available smart LED lighting devices often do not have wireless functions or voice recognition functions. Therefore, such smart LED lighting devices are not able to use smart LED components to send collected voice signals via the Internet, or to push and send alerts to any smart terminals, which limits its use in an increased number of different situations. For example, the smart LED lighting devices may not be able to tell whether an infant (or baby) is crying or not when parents are not in the room.

The disclosed systems and methods are directed to solve one or more problems set forth above and other problems.

BRIEF SUMMARY OF THE DISCLOSURE

One aspect or embodiment of the present disclosure includes a smart LED lighting system. The smart LED lighting system includes at least one smart LED lighting device, and at least one smart terminal configured to communicate with the at least one smart LED lighting device. The at least one smart LED lighting device includes a microphone module, a voice recognition module, and a wireless communication module sequentially connected in series. The microphone module is configured to collect audio signals from surroundings and to transmit the audio signals to the voice recognition module, such that the voice recognition module sends the audio signals to the smart terminal via the wireless communication module directly, or the voice recognition module voice-recognizes the audio signal according to an internal audio recognition software program to generate a notification message, and then the voice recognition module sends the notification message to the at least one smart terminal via the wireless communication module.

Optionally, the smart LED lighting system further includes a Wi-Fi router. The wireless communication module is connected to the Internet, via the Wi-Fi router, to transmit the audio signals or the notification message to the smart terminal.

Optionally, the wireless communication module is configured to use a Wi-Fi technology of 2.4G or 5G, or to use a mobile wireless communication technology of 2.5G, 3G, or 4G.

Optionally, the at least one smart terminal includes one of a cellphone, a tablet computer, and a desktop computer.

Optionally, the at least one smart LED lighting device further includes a speaker module, configured to play pre-recorded voices or to play voices sent from the at least one smart terminal.

Another aspect or embodiment of the present disclosure includes a monitoring method of a smart LED lighting system. The method includes various exemplary steps. In a first exemplary step, audio signals from surroundings are collected by a microphone module configured in a smart LED lighting device. In a second exemplary step, the audio signals are sent by the microphone module to a voice recognition module to perform voice recognition to generate a notification message. In a third exemplary step, the notification message is sent by the voice recognition module to a smart terminal via a wireless communication module.

Optionally, the smart LED lighting system further includes a Wi-Fi router and the wireless communication module is connected to the Internet via the Wi-Fi router to send the notification message to the smart terminal.

Optionally, the smart LED lighting device further includes a speaker module, configured to play pre-recorded voices or to play voices sent from the smart terminal.

Another aspect or embodiment of the present disclosure includes a smart LED lighting system. The smart LED lighting system includes at least one smart LED lighting device, including a microphone module and a wireless communication module connected in series. The smart LED lighting system also includes at least one smart terminal configured to communicate with the at least one smart LED lighting device. The at least one smart terminal is configured with an audio recognition software program. The microphone module is configured to collect audio signals from surroundings and to transmit the audio signals to the at least one smart terminal via the wireless communication module. The audio recognition software program in the at least one smart terminal is configured to voice-recognize the audio signal and to correspondingly generate a notification message.

Another aspect or embodiment of the present disclosure includes a monitoring method of a smart LED lighting system. The method includes various exemplary steps. In a first exemplary step, audio signals from surroundings are collected by a microphone module configured in a smart LED lighting device. In a second exemplary step, the audio signals are transmitted by the microphone module to a smart terminal via a wireless communication module. In a third exemplary step, an audio recognition software program configured in the smart terminal is used to voice-recognize the audio signals to generate a notification message.

Another aspect or embodiment of the present disclosure includes a smart LED lighting system. The smart LED lighting system includes at least one smart LED lighting device, a Wi-Fi router, a cloud server configured with an audio recognition software program, at least one smart terminal, and a microphone module and a wireless communication module connected in series within the at least one smart LED lighting device. The microphone module is configured to collect audio signals from surroundings and to transmit the audio signals via the wireless communication module to the Wi-Fi router and then to the cloud server. The audio recognition software program configured in the cloud server is used to voice-recognize the audio signals to generate a notification message correspondingly. The cloud server sends the notification message to the at least one smart terminal via the Wi-Fi router.

Another aspect or embodiment of the present disclosure includes a monitoring method of a smart LED lighting system. The method includes various exemplary steps. In a first exemplary step, audio signals from surroundings are collected by a microphone module configured in a smart LED lighting device. In a second exemplary step, the audio signals are transmitted by the microphone module to a cloud server via a wireless communication module and a Wi-Fi router. In a third exemplary step, the audio recognition software program configured in the cloud server is used to voice-recognize the audio signals to generate a notification message, and to send the notification message to the smart terminal.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Smart LED lighting systems and monitoring methods of the smart LED lighting systems are provided. An exemplary smart LED lighting system includes a smart LED lighting device, and a smart terminal configured to communicate with the smart LED lighting device. The smart LED lighting device at least includes a microphone module, and a wireless communication module sequentially connected in series.

In one embodiment, a voice recognition module can be configured in the smart LED lighting device. In another embodiment, an audio recognition software program (or a voice recognition module) can be configured in the smart terminal. In a further embodiment, the smart LED lighting systems may further include a cloud server, and an audio recognition software program (or a voice recognition module) can be configured in the cloud server.

The microphone module is configured to collect audio signals from surroundings and to transmit the audio signals for voice recognition by the voice recognition module or by the audio recognition software program. The audio signals are recognized to generate a notification message. The notification message is then sent to the smart terminal.

The smart LED lighting systems can be used for remote monitoring. Compared with current technologies, the disclosed smart LED lighting devices can include a built-in microphone module. For example, in a place having the disclosed smart LED lighting device, user's voices can be collected (by the microphone module), recognized, and transmitted to the smart terminal (via a wireless communication module). This enables simultaneous indoor lighting and smart monitoring.

Further, the smart LED lighting devices may also include a speaker module. The speaker module can be configured to play pre-recorded voices or to play voices sent from the smart terminal. The smart LED lighting devices may function according to various different circumstances. For example, parents' voices can be played to comfort a crying infant (or baby).

Figure 1:
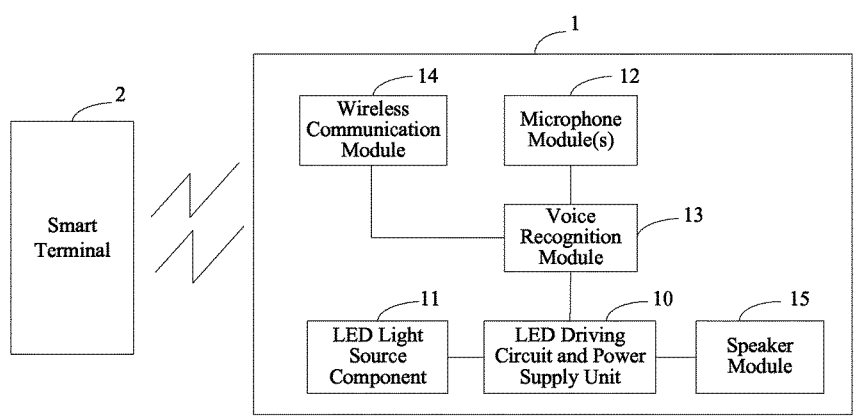
FIG. 1 is a block diagram illustrating an exemplary smart LED lighting system consistent with various disclosed embodiments.

FIG. 1 shows an exemplary smart LED lighting system consistent with various disclosed embodiments of present disclosure. As shown in FIG. 1, the smart LED lighting system includes at least one smart LED lighting device 1, and at least one smart terminal configured to communicate with the smart LED lighting device 1.

The smart LED lighting device 1 includes an LED driving circuit and power supply unit 10, an LED light source component 11, a microphone module 12, a voice recognition module 13, and a wireless communication module 14. The LED driving circuit and power supply unit 10 is configured to drive the LED light source component 11 and provide power for the entire LED lighting device 1. The voice recognition module 13 is connected with the LED driving circuit and power unit 10. The microphone module 12 and the wireless communication module 14 are also connected with the voice recognition module 13.

The microphone module 12 is configured to collect audio signals from the surroundings of the smart LED lighting device 1, and to transmit the audio signals to the voice recognition module 13. The voice recognition module 13 can use an audio recognition software program from an internal memory to recognize the voices/audio signals according to voice recognition algorithms and to generate a corresponding notification message. The voice recognition module 13 can then send the notification message to the smart terminal 2 via the wireless communication module 14. Alternatively, the voice recognition module 13 can directly send the original audio signals to the smart terminal 2 via the wireless communication module 14.

The present disclosure can be suitable for a variety of application scenarios. For example, when parents are busy at home or outside, the smart LED lighting device 1 can monitor an infant/baby to see if he/she is crying, and timely push and send notification messages or voice alerts to the smart terminal 2 carried by the parents to inform the parents. In another example, in hospitals or nursing homes, the smart LED lighting device can collect calling voices or collect sound accompanied with people's falling down to monitor patients with serious conditions or to help senior people that need assistance.

Further, a speaker module 15 can be configured in the smart LED lighting device 1. The speaker module 15 is connected with the LED driving circuit and power supply unit 10. When a baby is crying, the speaker module 15 can play parents' voices either pre-recorded or sent from the smart terminal 2 to comfort the baby.

In one embodiment, the wireless communication module 14 may be configured to use a Wi-Fi technology of 2.4G or 5G, or to use a mobile wireless communication technology of 2.5G, 3G, or 4G.

In one embodiment, the smart terminal may be a cellphone, a tablet computer, or a desktop computer. In one embodiment, any suitable known audio recognition software programs can be used and encompassed in the present disclosure.

Figure 2:
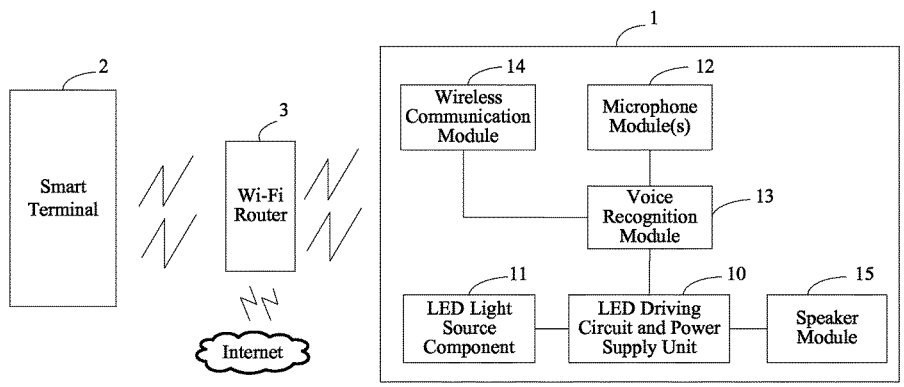
FIG. 2 is a block diagram illustrating another exemplary smart LED lighting system consistent with various disclosed embodiments.

FIG. 2 illustrates another exemplary smart LED lighting system consistent with various disclosed embodiments. For example, the wireless communication module 14 in the smart LED lighting system in FIG. 1 may not have wireless routing function. As shown in FIG. 2, a Wi-Fi router 3 can be included based on the smart LED lighting system in FIG. 1. In this case, the wireless communication module 14 is connected to the Internet via the Wi-Fi router 3 to send notification messages to the smart terminal 2.

Figure 3:
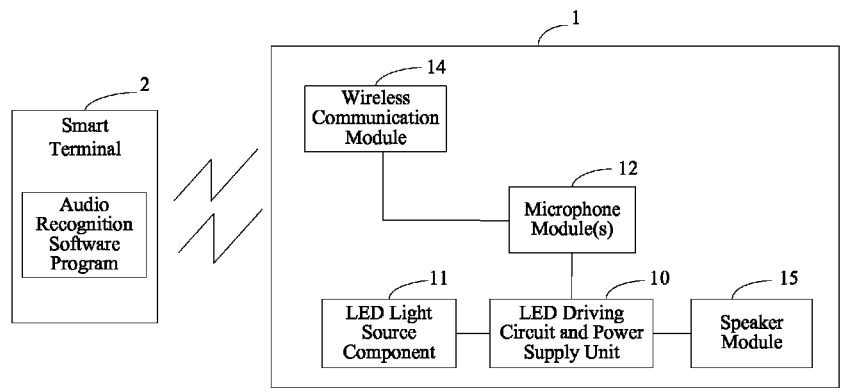
FIG. 3 is a block diagram illustrating another exemplary smart LED lighting system consistent with various disclosed embodiments.

FIG. 3 illustrates another exemplary smart LED lighting system consistent with various disclosed embodiments. Compared with the exemplary smart LED lighting system shown in FIG. 1, voice recognition is performed by the smart terminal. In this case, instead of configuring the voice recognition module in the LED lighting device 1, an audio recognition software program can be installed in the smart terminal 2. The microphone module 12 collects audio signals from the surroundings and transmits the audio signals to the smart terminal 2 via the wireless communication module 14. The audio recognition software program installed in the smart terminal 2 then voice-recognizes the audio signals and generates corresponding notification messages.

Figure 4:
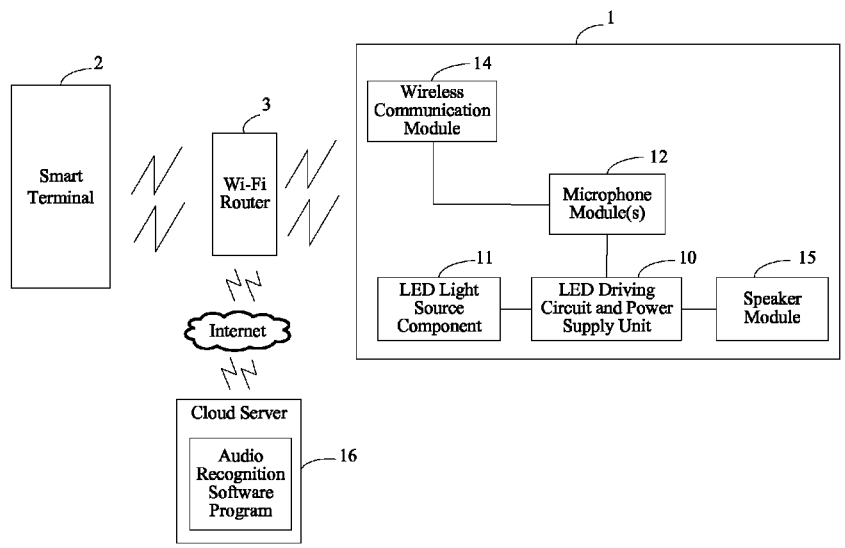
FIG. 4 is a block diagram illustrating another exemplary smart LED lighting system consistent with various disclosed embodiments.

FIG. 4 illustrates another exemplary smart LED lighting system consistent with various disclosed embodiments. Compared with the exemplary smart LED lighting system shown in FIG. 2, the voice recognition is carried out by the cloud server as shown in FIG. 4. In this case, the LED lighting device 1 does not include the voice recognition module, instead, an audio recognition software program is installed in a cloud server 16. The microphone module 12 collects the audio signals from the surroundings and sends the audio signals to the Wi-Fi router 3 via the wireless communication module 14. The audio signals are further transmitted to the cloud server 16. The cloud server 16 uses the audio recognition software program to voice-recognize the audio signal and to generate corresponding notification messages, and then send the notification messages to the smart terminal 2 via the Wi-Fi router 3.

In various embodiments, the disclosed smart LED lighting system may include at least two microphone modules. For example, two microphone modules can be configured symmetrically (or sometimes asymmetrically) within each smart LED lighting device 1 shown in FIGS. 1-4. The two microphone modules may be configured to cancel the noises (e.g., same background noises) received by the two microphone modules. Smart LED lighting device 1 can thus more effectively collect desired audio signals (e.g., human voices and/or music) from surrounding environments. In these embodiments, the noise cancellation function can offset the effect of distracting noises and can provide the disclosed smart LED lighting device 1 with an improved signal to noise ratio.

In various embodiments, the disclosed smart LED lighting system may implement echo cancellation functions. For example, the echo cancellation function can be provided by the microphone module(s) 12 configured within the smart LED lighting device 1 shown in FIGS. 1-4 and/or can be processed by the software program of the voice recognition module 13 configured within the smart LED lighting device 1 shown in FIGS. 1-2.

In some embodiments, the LED light source component 11 of smart LED lighting device 1 may be controlled based on the result of voice recognition functions, including the noise cancellation or echo cancellation functions. For example, if the voice recognition function of smart LED lighting device 1 does not recognize a voice command received, the LED light source component 11 may blink or change color for a short period of time (e.g., about 0.5 second) so that the end user may speak more clearly and try to give the voice command again. Based on the light indication, the user may further adjust the speakers and/or the software program of the voice recognition module 13 to improve the performance of the voice recognition module.

In some embodiments, a plurality of smart LED lighting devices 1 may be connected together. A user may give voice commands to control one or more LED light source components 11 of LED lighting devices 1. The plurality of smart LED lighting devices 1 may also share the results of its voice recognition functions. For example, one or more of smart LED lighting devices 1 closest to the user may have recognized a voice command but the smart LED lighting devices 1 farther away from the user may not have recognized the voice command. The network of smart LED lighting devices 1 may share the results of the voice recognition (e.g., the recognized voice command) and respond to the voice command accordingly.

In one example, four smart LED lighting devices 1A, B, C and D may be connected into one network. Two smart LED lighting devices 1A and B may be located closely to the user. Two smart LED lighting devices 1C and D may be located far away from the user. Smart LED lighting devices 1A and B received and recognized a voice command "turn on light C." Smart LED lighting devices 1C and D received but did not recognize the voice command. Because the lighting devices are connected, smart LED lighting device 1C would be turned on in response to the user command recognized by smart LED lighting devices 1A and B.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Smart LED lighting systems and methods for monitoring the smart LED lighting systems are provided. An exemplary smart LED lighting system includes a smart LED lighting device, and a smart terminal configured to communicate with the smart LED lighting device. The smart LED lighting device at least includes a microphone module, and a wireless communication module sequentially connected in series.

The smart LED lighting device is an integrated device with a microphone module, a voice recognition module, and a wireless communication module connected in series. In one example, the antennas of the microphone module and the wireless communication module may conform to the shape of the LED lighting device. As a result, the smart LED lighting device is of the same or similar size as a conventional LED light and may be used in the place of conventional LED lights.

In one embodiment, a voice recognition module can be configured in the smart LED lighting device. In another embodiment, an audio recognition software program (or a voice recognition module) can be configured in the smart terminal. In a further embodiment, the smart LED lighting systems may further include a cloud server, and an audio recognition software program (or a voice recognition module) can be configured in the cloud server.

The microphone module is configured to collect audio signals from surroundings and to transmit the audio signals for voice recognition by the voice recognition module or by the audio recognition software program. The audio signals are recognized to generate a notification message. The notification message is then sent to the smart terminal.

The smart LED lighting systems can be used for remote monitoring. The smart LED lighting systems can be suitable for a variety of application scenarios. For example, when parents are busy at home or outside, the smart LED lighting device 1 can monitor an infant (or baby) to see if he/she is crying, and timely push and send notification messages or voice alerts to the smart terminal 2 carried by the parents to inform the parents. In another example, in hospitals or nursing homes, the smart LED lighting device can collect calling voices or collect sound accompanied with people's falling down to monitor patients with serious conditions or to help senior people that need assistance.

Further, the smart LED lighting devices may include a speaker module, configured to play pre-recorded voices or to play voices sent from the smart terminal. The smart LED lighting devices may thus function according to various different circumstances. For example, parents' voices either pre-recorded or sent from the smart terminal can be played to comfort a crying baby.

REFERENCE SIGN LIST

Smart LED lighting device 1
Smart terminal 2
Wi-Fi router 3
LED driving circuit and power supply unit 10
LED light source component 11
Microphone module 12
Voice recognition module 13
Wireless communication module 14
Speaker module 15
Cloud server 16

What is claimed is:

1. A smart LED lighting system, comprising:
   at least one smart LED lighting device; and
   at least one smart terminal configured to communicate with the at least one smart LED lighting device, the at least one smart LED lighting device comprising:
   a microphone module, a voice recognition module, and a wireless communication module sequentially connected in series,
   wherein the microphone module is configured to collect audio signals from surroundings and to transmit the audio signals to the voice recognition module such that the voice recognition module sends the audio signals to the smart terminal via the wireless communication module directly, or the voice recognition module voice-recognizes the audio signals according to an internal audio recognition software program to generate a notification message, and then the voice recognition module sends the notification message to the at least one smart terminal via the wireless communication module.

2. The smart LED lighting system according to claim 1, further comprising a Wi-Fi router, wherein the wireless communication module is connected to the Internet, via the Wi-Fi router, to transmit the audio signals or the notification message to the smart terminal.

3. The smart LED lighting system according to claim 1, wherein the wireless communication module is configured to use a Wi-Fi technology of 2.4G or 5G, or to use a mobile wireless communication technology of 2.5G, 3G, or 4G.

4. The smart LED lighting system according to claim 1, wherein the at least one smart terminal comprises one of a cellphone, a tablet computer, and a desktop computer.

5. The smart LED lighting system according to claim 1, wherein the at least one smart LED lighting device further comprises a speaker module, configured to play pre-recorded voices or to play voices sent from the at least one smart terminal.

6. The smart LED lighting system according to claim 1, further including at least two microphone modules configured within the at least one smart LED lighting device to cancel noises from the surroundings.

7. The smart LED lighting system according to claim 1, wherein the microphone module is configured to provide an echo cancellation function.

8. The smart LED lighting system according to claim 1, wherein the voice recognition module within the at least one smart LED lighting device is configured to provide an echo cancellation function.

9. A monitoring method of a smart LED lighting system, comprising:
   collecting audio signals from surroundings by a microphone module configured in a smart LED lighting device;
   sending the audio signals by the microphone module to a voice recognition module to perform a voice recognition to generate a notification message; and
   sending the notification message by the voice recognition module to a smart terminal via a wireless communication module.

10. The monitoring method of the smart LED lighting system according to claim 9, wherein the smart LED lighting system further comprises a Wi-Fi router and the wireless communication module is connected to the Internet via the Wi-Fi router to send the notification message to the smart terminal.

11. The monitoring method of the smart LED lighting system according to claim 9, wherein the smart LED lighting device further comprises a speaker module, configured to play pre-recorded voices or to play voices sent from the smart terminal.

12. A smart LED lighting system, comprising:
    at least one smart LED lighting device, comprising a microphone module and a wireless communication module connected in series; and
    at least one smart terminal configured to communicate with the at least one smart LED lighting device, the at least one smart terminal being configured with an audio recognition software program, wherein:

the microphone module is configured to collect audio signals from surroundings and to transmit the audio signals to the at least one smart terminal via the wireless communication module, and the audio recognition software in the at least one smart terminal is configured to voice-recognize the audio signals and to correspondingly generate a notification message.

* * * * *